Patented Aug. 17, 1954

2,686,808

UNITED STATES PATENT OFFICE 2,686,808

MANNICH REACTION COMPOUNDS

James M. Sprague, Drexel Hill, Pa., assignor to Merck & Co., Inc., a corporation of New Jersey No Drawing. Application August 31, 1949,
Serial No. 113,496

3 Claims. (Cl. 260—567.6)

This invention is concerned broadly with new quaternary ammonium salts. It is more particularly concerned with the quaternized salts of tertiary amines, which amines are obtained by reacting aryl-alkyl ketones according to the Mannich reaction. Further, the invention is also particularly concerned with the quaternary salts of the tertiary amines obtained by converting the ketonic group of the amines obtained by the Mannich reaction to a carbinol or methylene group.

The new compounds embraced by this invention can be represented by the general formula

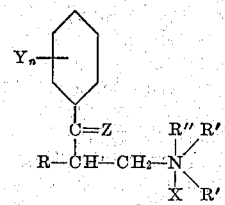

in which R is hydrogen or a substituted or unsubstituted alkyl radical containing up to sixteen carbon atoms, R' is lower alkyl, R'' is a lower alkyl radical or a saturated or unsaturated aralkyl radical containing less than 18 carbon atoms, X is an anion, such as, for example, halide, sulfate, sulfonate, acetate, and in general the anions of the usual quaternizing agents; Y is hydrogen or an alkyl group containing less than 20 carbon atoms; n is one, two or three; and Z represents the remaining valences of the alpha carbon atom of the benzyl group, which may be satisfied by oxygen when ketonic, by hydrogen and a hydroxyl group when carbinol, and by two hydrogen atoms when methylene.

These new quaternary ammonium compounds exhibit bactericidal and germicidal action and are useful as such agents, for example for sterilizing, for treatment of cuts and wounds, for use as a gargle, and for other therapeutic uses. The unquaternized compounds are useful as intermediates and have application as therapeutic agents.

The ketonic compounds represented by the general formula

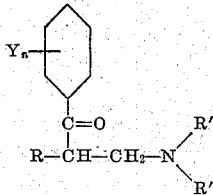

in which the various symbols have the significance above referred to, are preferred by reacting various aryl alkyl ketones with formaldehyde and a secondary amine in an acidic medium according to the Mannich reaction. Particularly suitable aryl alkyl ketones are decanophenone, undecanophenone, dodecanophenone, and nuclearly-alkyl-substituted acetophenones. Dimethylamine is an example of a suitable secondary amine. The quaternary ammonium salts of the resultant ketonic tertiary amines exhibit bactericidal and germicidal activity, although their life span in aqueous solution is of limited duration because of decomposition.

Aryl alkyl ketones suitable for reaction with formaldehyde and dimethylamine to produce ketonic tertiary amines are, for example, hexanophenone, octanophenone, nonanophenone, decanophenone, undecanophenone, dodecanophenone, tetradecanophenone, p-hexylacetophenone, p-dodecylacetophenone, p-tetradecylacetophenone, p-octylpropiophenone, omega-cyclohexylalkyl phenyl ketones, p-hexylhexanophenone, p-butylheptanophenone. These ketones on reaction with formaldehyde and dimethylamine yield the tertiary amines, (2-benzoylhexyl)-dimethylamine, (2-benzoyloctyl)-dimethylamine, (2-benzoylnonyl)-dimethylamine, (2-benzoyldecyl)-dimethylamine, (2-benzoylundecyl)-dimethylamine, (2-benzoyldodecyl)-dimethylamine, (2-benzoyltetradecyl-)dimethylamine, (2-p-hexylbenzoylethyl)-dimethylamine, (2-p-dodecylbenzoyl-ethyl)-dimethylamine, (2-p-tetradecylbenzoyl-ethyl)-dimethylamine, (2-p-octylbenzoyl-propyl)-dimethylamine, (2-benzoyl-omega-cyclohexyl-alkyl)-dimethylamines, (2-p-hexylbenzoyl-hexyl)-dimethylamine, and (2-p-butylbenzoyl-heptyl)-dimethylamine. It is to be noted that the compounds with di- and tri-alkyl substituents in the benzoyl nucleus are suitable as well as the monoalkyl-substituted compounds.

The above compounds are useful in the preparation of the carbinol and methylene-type tertiary amines, and further, because of the known instability of the tertiary amines and corresponding quaternary ammonium salts, can be used to obtain the vinyl compounds by decomposition and loss of the nitrogen grouping.

Starting with the above named aminoketones, various alcohols are obtained by converting the hydrochlorides of the aminoketones to the corresponding alcohols by catalytic hydrogenation, for example, by using a palladium-on-charcoal catalyst. The amino alcohols are isolated either as the hydrochlorides or as the free bases, the bases being in general colorless oils and stable to distillation.

Starting with the appropriate ketones, by hydrogenation there can be obtained various desired alcohols, for example, (2-α-hydroxybenzyl-hexyl)-dimethylamine, (2 - α - hydroxybenzyl-octyl) - dimethylamine, (2 - α - hydroxybenzyl-decyl)-dimethylamine, (2-α-hydroxybenzyl-undecyl) - dimethylamine, (2 - α - hydroxybenzyl-dodecyl) - dimethylamine, (2 - α - hydroxybenzyl-tetradecyl)-dimethylamine and [2-(α-hydroxybenzyl) - omega - cyclohexyl - alkyl] - dimethyl-amines.

The methylene-type tertiary amines, such as 2-benzyldodecyl-dimethylamine, have been prepared by catalytically hydrogenating the appropriate ketonic or carbinol compounds. With higher molecular weight alkyl groupings attached to the ketonic or carbinol type carbon atom of the starting material, it was necessary to use long reaction time, or high temperature and pressure.

The ketone, (2-benzoyl-dodecyl)-dimethylamine, was hydrogenated in the presence of a palladium-charcoal catalyst prepared in the presence of sodium acetate, to give 2-benzyldodecyl-dimethylamine. Further methods of preparation are hydrogenation of the acetate of the appropriate carbinol in the presence of palladium-charcoal catalyst, and hydrogenation of the appropriate carbinol in the presence of copper chromite catalyst at approximately 200° C.

By similar methods of hydrogenation there were obtained, by starting with the appropriate carbinol compound, such compounds as 2-benzyl-tetradecyl-dimethylamine, (3-p-dodecylphenyl-propyl)-dimethylamine and (3-p-tetradecyl-phenylpropyl)-dimethylamine. The hydrochlorides of these compounds exhibit germicidal and bactericidal action in solution and further the compounds are useful in the preparation of their quaternary ammonium salts.

The various ketonic, carbinol, and methylene type compounds above described are quaternized by reaction with the usual quaternizing compounds to produce bactericidal and germicidal compounds. Particularly effective quaternary ammonium salts are derived from benzyl and cinnamyl quaternary halides.

Starting with the respective ketonic, carbinol, or methylene compounds, obtained as above described, on reaction with a quaternizing agent, for example, benzyl or cinnamyl chloride or methyl iodide, there are obtained, for example, such compounds as:

(2-benzoyldodecyl)-trimethyl ammonium iodide
(2-benzoyldodecyl)-dimethyl - benzyl - ammonium chloride
Benzoyl-tetramethyl ammonium iodide
(2-α-hydroxybenzyl - hexyl) - dimethyl - benzyl-ammonium chloride
(2-α-hydroxybenzyl - octyl) - dimethyl - benzyl-ammonium chloride
(2-α-hydroxybenzyl-octyl)-dimethyl - cinnamyl-ammonium chloride
(2-α-hydroxybenzyl-decyl)-dimethyl-benzyl-ammonium chloride
(2-α-hydroxybenzyl-decyl)-dimethyl-cinnamyl-ammonium chloride
(2-α-hydroxybenzyl-undecyl)-dimethyl - benzyl-ammonium chloride
(2-α-hydroxybenzyl-undecyl) dimethyl - cinnamyl-ammonium chloride
(2-α-hydroxybenzyl-dodecyl)-dimethyl - benzyl -ammonium chloride
(2-α-hydroxybenzyl-dodecyl)-dimethyl-cinnamyl-ammonium chloride
(2-α-hydroxybenzyl-tetradecyl)-dimethyl-benzyl-ammonium chloride
(2-α-hydroxybenzyl-tetradecyl) - dimethyl - cinnamyl-ammonium chloride
[2-(α-hydroxy-p-octylbenzyl)-propyl]-dimethyl-benzyl-ammonium chloride
[2-(α-hydroxy-p-octylbenzyl)-propyl]-dimethyl-cinnamyl-ammonium chloride
[2-(α-hydroxy-p-butylbenzyl) heptyl]-dimethyl-benzyl-ammonium chloride
[2-(α-hydroxy-p-butylbenzyl)-heptyl] - dimethyl-cinnamyl-ammonium chloride
[2-(α-hydroxybenzyl)-3-cyclohexyl-propyl] - dimethyl-benzyl-ammonium chloride
[2-(α-hydroxybenzyl)-4-cyclohexyl - butyl] - dimethyl-benzyl-ammonium chloride
[2-(α-hydroxybenzyl)-4-cyclohexyl - butyl] - dimethyl-cinnamyl-ammonium chloride
[2-(α-hydroxybenzyl)-5-cyclohexyl - pentyl]-dimethyl-benzyl-ammonium chloride
[2-(α-hydroxybenzyl)-5-cyclohexyl - pentyl]-dimethyl-cinnamyl-ammonium chloride
(2-benzyl-dodecyl)-dimethyl-benzyl-ammonium chloride, and
(2-p-dodecylbenzyl-propyl) - dimethyl - benzyl-ammonium chloride It is apparent from the above that the substituted alkyl portion of the quaternary amine can consist of as few as two carbon atoms, for example, when the starting material is acetophenone, and that the chain can be of considerable length as, for example, when the starting material is tetradecanophenone.

It is to be realized that the portion of the molecule indicated by the symbol R in the general formula can be a substituted alkyl radical, for instance, aralkyl or cycloaliphatic-substituted-alkyl, as, for example, when 2-cyclohexylethyl phenyl ketone is used for the starting material. Further, the alkyl radical can be saturated or unsaturated, and straight or branch chain.

The invention is illustrated by, but not necessarily limited to, the following examples:

*Example 1.—Preparation of (2-benzoylundecyl)-dimethylamine hydrochloride.*—Into a one liter flask equipped with a reflux condenser was placed 51 grams (0.207 mole) of undecanophenone, 7.08 grams (0.079 mole) of paraformaldehyde, 18.55 grams (0.228 mole) of dimethylamine hydrochloride, and 104 ml. of anhydrous ethyl alcohol to which had been added six drops concentrated hydrochloric acid. The mixture was refluxed for approximately 120 hours. At three intervals, the refluxing was interrupted long enough to add 1.44 grams of paraformaldehyde and 4 grams of dimethylamine hydrochloride. At the end of the heating period the solvent was removed by evaporation at room temperature in a current of air. The residue was titurated with isopropyl ether until a test portion was completely soluble in water. The product was purified by recrystallization from boiling water. The product, (2-benzoylundecyl)-dimethylamine hydrochloride, M. P. 133–134° C. uncorr., was obtained in 57% of the theoretical yield.

Other examples of the preparation of Mannich ketone hydrochlorides are illustrated below. The indicated starting ketone is treated according to a procedure similar to that outlined in Example 1 and by use of similar molar proportions to yield the indicated Mannich ketone. The reaction time will vary between approximately ten and one hundred and twenty hours depending on the particular reactants. In general, the completion of the reaction is indicated by relatively complete solubility of a test portion in water.

| Starting Material | Compound Obtained | M. P., °C., uncorr. |
|---|---|---|
| p-dodecylacetophenone. | (2-p-dodecylbenzoyl-ethyl)-dimethylamine hydrochloride. | 142–142.5 |
| p-octylphenyl ethyl ketone. | (2-p-octylbenzoyl-propyl)-dimethylamine hydrochloride. | 139–140 |
| 2'-cyclohexylethyl phenyl ketone. | (2-benzoyl-3-cyclohexyl-propyl)-dimethylamine hydrochloride. | 181–182 |
| Hexanophenone. | (2-benzoylhexyl)-dimethylamine hydrochloride. | 129.5–130 |
| p-butylphenyl hexyl ketone. | (2-p-butylbenzoylheptyl)-dimethylamine hydrochloride. | 108–109 |
| Octanophenone. | (2-benzoyloctyl)-dimethylamine hydrochloride. | 130–131 |
| Decanophenone. | (2-benzoyldecyl)-dimethylamine hydrochloride. | 129–130 |
| Dodecanophenone. | (2-benzoyldodecyl)-dimethylamine hydrochloride. | 131–132 |
| Tetradecanophenone. | (2-benzoyltetradecyl)-dimethylamine hydrochloride. | 130.5–131 |

All of the above indicated starting materials are known except 2-cyclohexylethyl phenyl ketone. This ketone was prepared as follows:

156 grams (1.0 mole) of 3-cyclohexylpropionic acid was treated with 154.7 gm. (1.3 moles) of thionyl chloride by maintaining the mixture of the reactants at reflux temperature until sulfur dioxide and hydrogen chloride were no longer evolved. The mixture was distilled under reduced pressure and the 3-cyclohexylpropionyl chloride collected, B. P. 110–111° C. at 15 mm.

A mixture of 714.6 gms. (9.16 moles) of benzene and 158.7 gms. (1.19 mole) of aluminum chloride were stirred together in a flask, equipped with a dropping funnel and a reflux condenser, on a steam bath. There was added dropwise over a period of about one hour 160 gms. (0.916 mole) 3-cyclohexylpropionyl chloride. The mixture was refluxed for one and one-half hours after which it was hydrolyzed with a mixture of concentrated hydrochloric acid (200 ml.) and water (200 ml.). Then 400 ml. water was added and the benzene layer separated.

The benzene layer was washed with water three times, shaken with sodium sulfate and filtered. The benzene was removed from the filtrate by distillation under reduced pressure. The fraction distilling between 136–138° C. at about 1 mm. was 2-cyclohexylethyl phenyl ketone, a colorless liquid.

Example 2.—Preparation of (2 - benzoyldodecyl)-dimethylamine.—24.28 gm. of (2-benzoyldodecyl)-dimethylamine hydrochloride (obtained as in Example 1) was disolved in 200 ml. water at room temperature. The solution was made alkaline with a slight excess of sodium hydroxide and then saturated with sodium chloride. The free base was precipitated as an oil. The oil was extracted from the water phase with 75 ml. isopropyl ether. The ether solution was washed five times with water, dried over anhydrous sodium sulfate and filtered. The ether was removed under vacuum at room temperature. The residue was dried in vacuo over concentrated sulfuric acid. There was obtained 18.59 gm. of (2-benzoyldodecyl)-dimethylamine, $n_D^{25}$ 1.4940.

Example 3.—Preparation of (2-α-hydroxybenzyl-undecyl)-dimethylamine.—A one liter three-necked flask was equipped with a mercury-filled stirrer and each side neck closed with a neoprene stopper fitted with a glass stopcock. Air in the flask was replaced with nitrogen. Into the flask was placed 34 grams (0.10 mole) of (2-benzoylundecyl)-dimethylamine hydrochloride (obtained as in Example 1), 9.2 grams palladium (10%) on charcoal catalyst, and 500 ml. of anhydrous denatured ethyl alcohol. The nitrogen was replaced with hydrogen. Both stopcocks were closed and one was then connected with a hydrogen buret and that stopcock opened. A stirrer was started and the reduction allowed to proceed until 0.10 mol (1 molar equivalent) of hydrogen was taken up.

The reaction mixture was filtered to remove the catalyst. The filtrate was evaporated in a current of air until most of the alcohol was removed. The residue was dissolved in approximately 600 ml. of water and made alkaline with an excess of 28% ammonium water, whereupon the base separated as an oil. The base was dissolved in benzene, washed three times with water and distilled under reduced pressure. The distillate between 187–188° C. at about 2 mm. pressure was collected. The product, (2-α-hydroxybenzyl-undecyl)-dimethylamine, was obtained in 81% of the theoretical yield.

Other examples of the preparation of Mannich alcohols are illustrated below. The indicated starting ketone is reacted according to a procedure similar to that outlined in Example 2 and in similar molar proportions, to yield the indicated Mannich alcohol:

| Starting Material | Compound Obtained | Phys. Constants Temp. Uncorr. |
|---|---|---|
| (2-p-dodecylbenzoyl-ethyl)-dimethylamine | [2-(α-hydroxy-p-dodecylbenzyl)-ethyl]-dimethylamine | M. P., hydrochloride, 119–120° C. |
| (2-p-octylbenzoyl-propyl)-dimethylamine | [2-(α-hydroxy-p-octylbenzyl)-propyl]-dimethylamine | B. P. 176–178° C. at 1 mm. |
| (2-benzoyl-3-cyclohexyl-propyl)-dimethylamine | [2-(α-hydroxybenzyl)-3-cyclohexyl-propyl]-dimethylamine | M. P. 104–106° C. |
| (2-benzoyl-hexyl)-dimethylamine | (2-α-hydroxybenzyl-hexyl)-dimethylamine | B. P. 138–141° C., 1–2 mm. |
| (2-p-butyl-benzoyl-heptyl)-dimethylamine | [2-α-hydroxy-p-butylbenzyl)-heptyl]-dimethylamine | M. P., hydrochloride, 80–82° C. |
| (2-benzoyl-octyl)-dimethylamine | (2-α-hydroxybenzyl-octyl)-dimethylamine | B. P., 158–160° C., 1–2 mm. |
| (2-benzoyl-decyl)-dimethylamine | (2-α-hydroxybenzyl-decyl)-dimethylamine | B. P., 178–180° C., 2 mm. |
| (2-benzoyl-dodecyl)-dimethylamine | (2-α-hydroxybenzyl-dodecyl)-dimethylamine | B. P., 190–193° C., 1–2 mm. |
| (2-benzoyl-tetradecyl)-dimethylamine | (2-α-hydroxy-benzyl-tetradecyl)-dimethylamine | B. P., 209–211° C., 1–2 mm. |

Starting with the appropriate cyclohexylalkanoic acid, it is possible, by a series of reactions similar to those just described, to prepare various omega-cyclohexylalkyl phenyl ketones, for example, 3-cyclohexylpropyl phenyl ketone, 4-cyclohexylbutyl phenyl ketone, and 5-cyclohexylpentyl phenyl ketone.

Example 4.—Preparation of 2-benzyldodecyl-dimethylamine.—Into a 200 ml. flask equipped with reflux condenser was placed a mixture of 35.6 grams (0.10 mole) of (2-α-hydroxybenzyldodecyl)-dimethylamine hydrochloride (obtained as in Example 2) and 40.8 grams (0.40 mole) of acetic anhydride, which was gently warmed to refluxing and gentle refluxing maintained during 2½ hours. The mixture was poured into a beaker and allowed to cool. On cooling there was obtained a thick mass of crystals which was collected on a Buchner funnel, washed with a little absolute ethyl acetate and recrystallized from boiling anhydrous ethyl alcohol. There was obtained (2 - α - acetoxybenzyl - dodecyl) dimethylamine hydrochloride in 78% of the theoretical yield, M. P. 190–191° C. uncorr.

The palladium-charcoal catalyst used in the hydrogenation step was prepared as follows:

100 ml. of a 10% solution of palladium chloride, 100 gm. of decolorizing charcoal, and 500 ml. of distilled water were stirred together for approximately ten minutes. With continued stirring a solution of 272 gm. (2.0 moles) of sodium acetate in 500 ml. of distilled water was added. The mixture was then stirred in an atmosphere of hydrogen until hydrogen was no longer taken up.

The catalyst was separated on a Buchner funnel, washed with distilled water until the washings gave a neutral reaction, and then dried by heating at a temperature substantially above 100° C. until all water vapor was driven off and the catalyst became a free flowing powder.

It is particularly to be noted that this palladium-charcoal catalyst can be very pyrophoric and accordingly should be handled carefully.

The acetylated Mannich alcohol obtained as described above was reduced to obtain the desired methylene compound, as follows:

23.88 grams (0.060 mole) of the acetylated Mannich alcohol, 20 grams of palladium catalyst (obtained as above described and equivalent to 2 grams palladium) and 500 ml. anhydrous ethyl alcohol were stirred in an atmosphere of hydrogen until the theoretical amount of hydrogen was taken up. This process required approximately 3 hours. The catalyst was separated by filtration and the filtrate evaporated to dryness at room temperature. The residue was dissolved in water and the solution made alkaline with 60 ml. of 28% ammonium water. The oil that separated was then dissolved in 100 ml. of benzene, washed three times with water and distilled under reduced pressure. The product obtained was 2-benzyldodecyl-dimethylamine, a colorless liquid. B. P. 177–180° C. at approximately 2 mm. pressure. The yield was 12.5 grams (68% of theoretical). The melting point of the amine hydrochloride is 103–104° C.

*Example 5.—Preparation of 2-benzyldodecyl-dimethylamine hydrochloride.*—3.33 grams (0.0104 mole) of (2-α-hydroxybenzyldodecyl)-dimethylamine, 3 grams of copper chromite catalyst, and 75 ml. of anhydrous ethyl alcohol were placed in a hydrogenation bomb. Hydrogen was added to a pressure of approximately 1500 lbs. per square inch at room temperature. The bomb temperature was raised to, and maintained at, approximately 200° C. and the pressure was then observed to be approximately 2400 lbs. per square inch. At the end of seven hours the bomb was allowed to cool. The reaction mixture was removed from the bomb and the alcohol evaporated in a stream of air. The residue was an oily base, which was converted into the hydrochloride by reaction with hydrochloric acid and then dried. The yield of the crude hydrochloride was 2.6 grams (73% of theoretical yield). On recrystallization from boiling absolute ethyl alcohol, the hydrochloride melted at 103.5–104.5° C. (uncorr.) The mixed melting point of this hydrochloride with the hydrochloride obtained as in Example 4 was 103–104° C.

*Example 6.—Preparation of (3-p-dodecylphenyl-propyl)-dimethylamine hydrochloride.*—2.7 grams (0.0071 mole) of (2-p-dodecylbenzoylethyl)-dimethylamine hydrochloride (obtained as in Example 1), 2.0 ml. concentrated hydrochloric acid, 198 mls. of water and 3.0 grams of palladium-charcoal catalyst were shaken overnight in an atmosphere of hydrogen. The catalyst was removed by filtration, the filtrate evaporated, and the residue recrystallized from benzene and hexane. The product was recrystallized from a mixture of isopropyl ether and anhydrous ethyl alcohol denatured with 5% benzene, yielding 0.70 gram of (3-p-dodecylphenylpropyl)-dimethylamine hydrochloride, M. P. 185.5–187° uncorr.

*Example 7.—Preparation of (2-benzoyldodecyl)-dimethyl-benzyl-ammonium chloride.*—6.35 grams (0.02 mole) of (2-benzoyldodecyl)-dimethylamine (obtained as in Example 2), and 2.35 grams (0.02 mole) benzyl chloride were mixed together and allowed to stand at approximately 30–35° C. until a test portion of the solid product was completely soluble in water. The product (2-benzoyldodecyl)-dimethyl - benzyl-ammonium chloride, was a glassy solid. An aqueous solution of the material as prepared was tested for bactericidal activity and found to be effective.

*Example 8.—Preparation of (2-benzoyldodecyl) - trimethyl - ammonium iodide.*—2.3 grams (0.0072 mole) of (2-benzoyldodecyl)-dimethylamine (obtained as in Example 2), and 1.02 grams (0.0072 mole) methyl iodide were mixed together in a flask. The reaction mixture became warm almost at once and after about two minutes was quite viscous. The flask was stoppered and the mixture was allowed to stand overnight at approximately 30–35° C. An aqueous solution of the crude material was tested for bactericidal activity and found to be effective.

*Example 9.—Preparation of (2-α-hydroxybenzyl - undecyl) - dimethyl - cinnamylammonium chloride.*—10.69 grams (0.035 mole) of (2-α-hydroxybenzyl - undecyl) - dimethylamine (obtained as in Example 3), and 5.34 grams (0.035 mole) cinnamyl chloride were placed in a stoppered glass flask and the mixture thoroughly shaken. It was then allowed to stand at room temperature for four days until a test portion of the solid product was completely soluble in water. The crude reaction product was recrystallized from a boiling mixture of anhydrous ethyl alcohol and absolute ethyl acetate. There was obtained (2 - α - hydroxybenzyl-undecyl)-dimethyl-cinnamyl-ammonium chloride, M. P. 185–186° C. uncorr. in 69% yield.

*Example 10.—Preparation of (2-α-hydroxybenzyl-dodecyl) - dimethyl - benzylammonium chloride.*—4.23 grams (0.0132 mole) of (2-α-hydroxybenzyl-dodecyl)-dimethylamine (obtained as in Example 3), and 1.67 grams (0.0132 mole) benzyl chloride were mixed in a stoppered flask and allowed to stand at approximately 30–35° C. for a period of approximately 3 days. The reaction product was recrystallized from a mixture of anhydrous ethyl acetate and anhydrous ethyl alcohol yielding 2 - α - hydroxybenzyl-dodecyl)-dimethyl - benzyl - ammonium chloride, M. P. 178.5–179° C. uncorr.

*Example 11.—Preparation of [2-(α-hydroxy-p-octylbenzyl) - propyl] - dimethylcinnamyl-ammonium chloride.*—2.29 grams (0.0075 mole) of [2-(α-hydroxy - p - octylbenzyl)-propyl]-dimethylamine (obtained as in Example 3), and 1.14 grams (0.0075 mole) cinnamyl chloride, together with 100 mls. methanol were mixed and allowed to stand for approximately 3 days. The solvent was removed in vacuo and the residue recrystallized from ethyl alcohol and ether. There was obtained [2-(α-hydroxy-p-octylbenzyl)-propyl]-dimethyl-cinnamyl-ammonium chloride, M. P. 177.5–178.5° C. uncorr.

Other examples of the preparation of quaternary ammonium salts of the carbinol type tertiary amines obtained as in Example 3 are illustrated below. The quaternary ammonium salts listed below are obtained by reacting molar quantities of the appropriate tertiary amine with the appropriate quaternizing agent according to the procedures outlined in Examples 9, 10 and 11.

| Quaternary Ammonium Salts | M. P., ° C., Uncorr. |
|---|---|
| (2-α-hydroxybenzyl hexyl)-dimethyl-benzyl-ammonium choride | 194–5 |
| (2-α-hydroxybenzyl octyl)-dimethyl-benzyl-ammonium chloride | 186–7 |
| (2-α-hydroxybenzyl octyl)-dimethyl-cinnamyl-ammonium choride | 189.5–190.5 |
| (2-α-hydroxybenzyl decyl)-dimethyl-benzyl-ammonium chloride | 183–4 |
| (2-α-hydroxybenzyl decyl)-dimethyl-cinnamyl-ammonium chloride | 189 |
| (2-α-hydroxybenzyl undecyl)-dimethyl-benzyl-ammonium choride | 182–3 |
| (2-α-hydroxybenzyl dodecyl)-dimethyl-cinnamyl-ammonium chloride | 184–5 |
| (2-α-hydroxybenzyl tetradecyl)-dimethyl-benzyl-ammonium chloride | 173–4 |
| (2-α-hydroxybenzyl tetradecyl)-dimethyl-cinnamyl-ammonium chloride | 183–4 |
| [2-(α-hydroxy-p-butylbenzyl)-heptyl]-dimethyl-benzyl-ammonium choride | 198–9 |
| 2-(α-hydroxy-p-butylbenzyl)-heptyl]-dimethyl-cinnamyl-ammonium chloride | 200–201 |
| [2-(α-hydroxy-p-octylbenzyl)-propyl]-dimethyl-benzyl-ammonium chloride | 173–4 |
| [2-(α-hydroxybenzyl)-3-cyclohexyl-propyl]-dimethyl-benzyl-ammonium chloride | 193.5–194.5 |
| [2-(α-hydroxybenzyl)-3-cyclohexyl-propyl]-dimethyl-cinnamyl-ammonium chloride | 197–198 |

*Example 12.—Preparation of (2-benzyldodecyl)-dimethyl-benzyl-ammonium chloride.*—5.16 grams (0.17 mole) of 2-benzyldodecyl-dimethyl-amine (obtained as in Example 4), and 2.13 grams (0.17 mole) of benzyl chloride were mixed and allowed to stand at room temperature until a sample of the product was entirely soluble in water. The product was dissolved in a minimum amount of boiling absolute ethyl acetate and the hot solution diluted to about four times its volume with hexane. The product came out of solution as a very viscous oil. When cool, the supernatant liquid was decanted and the oil dried in vacuum over concentrated sulfuric acid. The dried product (2-benzyldodecyl)-dimethyl-benzyl-ammonium chloride was a very hygroscopic wax, such that it was not possible to obtain a melting point. An aqueous solution of the material was tested for bactericidal activity and found to be effective.

*Example 13.—Preparation of (3-p-dodecylphenyl)-propyl - dimethyl - benzyl - ammonium chloride.*—3.68 grams (0.01 mole) of (3-p-dodecylphenyl)-propyl-dimethylamine (obtained by treating the amine hydrochloride obtained as in Example 6 according to a procedure similar to that described in Example 2) and 2.5 ml. benzyl chloride, together with 100 ml. of benzene were mixed in a flask equipped with a reflux condenser. The mixture was refluxed for approximately 70 hours and the benzene removed by vacuum distillation. The residue was dried in vacuo over concentrated sulfuric acid and recrystallized from a mixture of anhydrous ethyl alcohol denatured with 5% benzene and petroleum ether. There was obtained 1.9 grams of (3-p-dodecylphenyl)-propyl - dimethyl - benzyl - ammonium chloride, M. P. 65–66° C. uncorr.

It is to be realized that the above examples are illustrative rather than limitative of the scope of the invention and that compounds embraced by the invention can be obtained by substituting for the enumerated reactants their equivalents.

What is claimed is:

1.

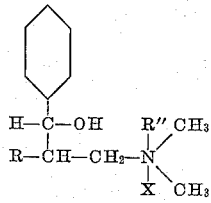

in which R is alkyl radical containing from 8 to 12 carbon atoms, R'' is chosen from the group consisting of benzyl and cinnamyl, and X is an anion.

2. (2 - α - hydroxybenzyl - undecyl) - dimethyl-cinnamyl-ammonium chloride.

3. (2-α-hydroxybenzyl - dodecyl) - dimethyl-benzyl-ammonium chloride.

References Cited in the file of this patent

UNITED STATES PATENTS

| Number | Name | Date |
|---|---|---|
| 2,276,587 | Mettler | Mar. 17, 1942 |

OTHER REFERENCES

Cohen et al., "J. Chem. Soc." (London), vol. 107 (1915), pp. 888, 901, 902.

Ingold et al., "J. Chem. Soc." (London), 1927, p. 810.

Dunn et al., "J. Chem. Soc." (London), 1934, p. 281.

Braun et al., "Ber. deut. Chem.," vol. 43 (1910), pp. 3215–6.

Mannich et al., "Ber. deut. Chem.," vol. 55 (1922), pp. 357, 361.

Braun et al., "Ber. deut. Chem.," vol. 55 (1922), pp. 3804, 3809.

Meisenheimer et al., "Liebigs Annalen," vol. 479 (1930), pp. 219, 220, 252–4.

Forneau, "Chemical Abstracts," vol. 1 (1907), p. 2886 (abstract of "J. Pharm. Chim.," Series 6, vol. 25 (1907), pp. 593 to 602.